United States Patent
Gillia et al.

(10) Patent No.: US 9,096,433 B2
(45) Date of Patent: Aug. 4, 2015

(54) HYDROGEN STORAGE TANK WITH METAL HYDRIDES

(75) Inventors: Olivier Gillia, Sassenage (FR); Albin Chaise, Grenoble (FR); Manon Elie, Grenoble (FR); Michel Planque, Seyssins (FR)

(73) Assignee: Commissariat á l'énergie atomique et aux énergies alternatives, Paris (FR)

( * ) Notice: Subject to any disclaimer, the term of this patent is extended or adjusted under 35 U.S.C. 154(b) by 331 days.

(21) Appl. No.: 13/509,303

(22) PCT Filed: Nov. 10, 2010

(86) PCT No.: PCT/EP2010/067205
§ 371 (c)(1),
(2), (4) Date: May 11, 2012

(87) PCT Pub. No.: WO2011/058053
PCT Pub. Date: May 19, 2011

(65) Prior Publication Data
US 2012/0222971 A1    Sep. 6, 2012

(30) Foreign Application Priority Data

Nov. 13, 2009 (FR) .................................. 09 58021

(51) Int. Cl.
*C01B 3/00* (2006.01)
*F17C 11/00* (2006.01)

(52) U.S. Cl.
CPC ............. *C01B 3/0005* (2013.01); *C01B 3/0026* (2013.01); *C01B 3/0031* (2013.01);
(Continued)

(58) Field of Classification Search
CPC ... Y02E 60/327; Y02E 60/321; Y02E 60/324; C01B 3/0005; C01B 3/0031; C01B 3/0042; C01B 3/0026; C01B 3/0036

USPC .............. 206/0.7, 0.6; 96/126, 129, 108, 146, 96/152, 154; 220/4.12
See application file for complete search history.

(56) References Cited

U.S. PATENT DOCUMENTS 4,133,426 A * 1/1979 Turillon et al. .................... 206/7
4,147,523 A * 4/1979 Izumo ............................. 96/126
(Continued)

FOREIGN PATENT DOCUMENTS

EP    0 188 996 A2    7/1986
EP    1 454 875 A2    9/2004
(Continued)

OTHER PUBLICATIONS

Preliminary Search Report issued Jul. 15, 2010 in French Patent Application No. 0958021 with English translation of categories of cited documents.
(Continued)

*Primary Examiner* — Anthony Stashick
*Assistant Examiner* — Ernesto Grano
(74) *Attorney, Agent, or Firm* — Oblon, McClelland, Maier & Neustadt, L.L.P.

(57) ABSTRACT

A tank for storing hydrogen through absorption into a material, the tank having a longitudinal axis and including an outer enclosure and an inner structure having a longitudinal axis, including a plurality of stages and a heat exchange system within the inner structure, each stage including a lower bottom, an upper bottom, longitudinal partition walls, and transverse partition walls. The partition walls form with the lower and upper bottoms compartments for receiving the hydrogen storage material. The upper bottom and/or the upper bottom and the transverse partition walls or longitudinal partition walls are made as a single piece.

18 Claims, 4 Drawing Sheets

(52) U.S. Cl.
CPC ............. *C01B3/0036* (2013.01); *C01B 3/0042* (2013.01); *F17C 11/005* (2013.01); *Y02E 60/321* (2013.01); *Y02E 60/327* (2013.01)

(56) References Cited

U.S. PATENT DOCUMENTS

| | | | |
|---|---|---|---|
| 4,436,537 A | | 3/1984 | Turillon |
| 4,446,111 A | | 5/1984 | Halene et al. |
| 4,457,136 A | * | 7/1984 | Nishizaki et al. ............. 62/46.2 |
| 4,492,332 A | * | 1/1985 | Collins ................... 229/120.36 |
| 4,581,049 A | * | 4/1986 | Januschkowetz .............. 96/126 |
| 4,667,815 A | | 5/1987 | Halene |
| 5,582,048 A | | 12/1996 | Schotthoefer |
| 6,432,176 B1 | * | 8/2002 | Klos et al. .................... 96/117.5 |
| 6,626,323 B2 | * | 9/2003 | Stetson et al. ................ 220/577 |
| 6,638,348 B2 | * | 10/2003 | Kuriiwa et al. ................ 96/146 |
| 6,708,546 B2 | * | 3/2004 | Myasnikov et al. ............ 72/121 |
| 6,709,497 B2 | * | 3/2004 | Myasnikov et al. ............ 96/126 |
| 7,115,159 B2 | * | 10/2006 | Fujita et al. ..................... 96/108 |
| 7,322,398 B2 | * | 1/2008 | Toh et al. ........................ 165/74 |
| 7,326,281 B2 | * | 2/2008 | Fujita et al. ..................... 96/108 |
| 7,418,782 B2 | * | 9/2008 | Kimbara et al. ........... 29/890.03 |
| 7,431,756 B2 | * | 10/2008 | Myasnikov et al. ............ 96/126 |
| 7,946,446 B2 | * | 5/2011 | Kimbara et al. ............... 220/586 |
| 7,947,119 B2 | * | 5/2011 | Golz et al. ....................... 95/116 |
| 8,051,977 B2 | * | 11/2011 | Fujita et al. ........................ 206/7 |
| 8,287,629 B2 | * | 10/2012 | Fujita et al. ..................... 96/126 |
| 8,646,597 B2 | * | 2/2014 | Yang et al. ......................... 206/7 |
| 2002/0006365 A1 | * | 1/2002 | Suzuki et al. ................... 422/177 |
| 2002/0100369 A1 | * | 8/2002 | Kuriiwa et al. ................ 96/146 |
| 2002/0117123 A1 | * | 8/2002 | Hussain et al. ................... 123/3 |
| 2002/0134370 A1 | | 9/2002 | Suzuki et al. |
| 2003/0160054 A1 | * | 8/2003 | Stetson et al. ................ 220/577 |
| 2003/0209147 A1 | * | 11/2003 | Myasnikov et al. ............ 96/146 |
| 2003/0215684 A1 | * | 11/2003 | Yang et al. ....................... 429/26 |
| 2004/0129048 A1 | | 7/2004 | Myasnikov et al. |
| 2004/0178083 A1 | | 9/2004 | Yang et al. |
| 2005/0013770 A1 | * | 1/2005 | Schulz et al. ............... 423/658.2 |
| 2005/0103196 A1 | | 5/2005 | Wu et al. |
| 2005/0188847 A1 | * | 9/2005 | Fujita et al. ...................... 96/126 |
| 2005/0211573 A1 | | 9/2005 | Myasnikov et al. |
| 2006/0266219 A1 | | 11/2006 | Ovshinsky et al. |
| 2009/0000963 A1 | | 1/2009 | Mori et al. |
| 2009/0127137 A1 | | 5/2009 | Golz et al. |
| 2010/0181213 A1 | * | 7/2010 | Fujita et al. ........................ 206/7 |
| 2010/0219087 A1 | * | 9/2010 | Fujita et al. ........................ 206/7 |
| 2011/0138748 A1 | | 6/2011 | Olivier et al. |
| 2011/0247495 A1 | * | 10/2011 | Marco et al. .................... 95/127 |
| 2012/0040825 A9 | * | 2/2012 | Hosoe et al. ................... 502/406 |
| 2012/0160711 A1 | * | 6/2012 | Yang et al. ......................... 206/6 |
| 2012/0160712 A1 | * | 6/2012 | Yang et al. ......................... 206/7 |
| 2012/0222972 A1 | | 9/2012 | Chaise et al. |

FOREIGN PATENT DOCUMENTS

| | | |
|---|---|---|
| FR | 2 508 596 A1 | 12/1982 |
| FR | 2 895 487 A1 | 6/2007 |
| JP | 50-52068 U | 5/1975 |
| JP | 58-2201 A | 1/1983 |
| JP | 58-8899 A | 1/1983 |
| JP | 58-91995 A | 6/1983 |
| JP | 62-124399 A | 6/1987 |
| JP | 62-191620 U | 12/1987 |
| JP | 3-4524 U | 1/1991 |
| JP | 9-242995 A | 9/1997 |
| JP | 2002-71098 A | 3/2002 |
| JP | 2008-281105 A | 11/2008 |
| JP | 2009-2370 A | 1/2009 |
| WO | WO 2007/124825 A1 | 11/2007 |

OTHER PUBLICATIONS

International Search Report issued Jan. 31, 2011 in PCT/EP2010/067205.

Japanese Office Action issued Sep. 8, 2014 in Patent Application No. 2012-538322 with English Translation.

* cited by examiner

HYDROGEN STORAGE TANK WITH METAL HYDRIDES

TECHNICAL FIELD AND PRIOR ART

The present invention relates to tank for storing hydrogen in the form of metal hydrides.

Because of a reduction in the crude oil reserves, in particular, alternative energy sources to petroleum are being searched for. One of the promising carriers of these energy sources is hydrogen which can be used in fuel cells to generate electricity.

Hydrogen is widespread in the universe and on Earth, it can be produced from coal, natural gas or other hydrocarbons, but also simply by electrolysis of water using for example the electricity generated by solar or wind energy.

Hydrogen cells are already used in some applications, for example in automotive vehicles but still are not widely used, in particular due to the precautions to be taken and difficulties in the hydrogen storage.

Hydrogen can be stored as hydrogen which is compressed between 350 and 700 bars, which raises safety problems. Tanks must then be provided that can withstand these pressures, and besides it should be reminded that these tanks, when mounted in vehicles, can be subjected to impacts.

It can be stored as a liquid, however this storage only gives a low storage yield and does not allow a storage for a long time. The hydrogen volume passing from the liquid state to the gas state under the standard pressure and temperature conditions produces an increase in its volume by a factor of about 800. The liquid form hydrogen tanks are not generally very resistant to mechanical impacts, and this raises serious safety problems.

There is also the storage of so-called "solid" hydrogen as hydride. This storage allows a high storage density and implements a moderate hydrogen pressure while minimising the storage energy impact on the global yield of the hydrogen line, that is from its production to its conversion into another energy source.

The solid storage principle of hydrogen as hydride is the following: some materials and in particular some metals have the capacity to absorb hydrogen to form a hydride, this reaction is called absorption. The formed hydride can again give hydrogen gas and a metal. This reaction is called desorption. The absorption or desorption occur depending on hydrogen partial pressure and temperature.

The absorption and desorption of hydrogen on a metal powder or matrix M are made according to the following reaction:

Storage: released heat (exothermic)

$$M + x/2\, H_2 \rightleftharpoons MH_x + \Delta H \text{ (Heat)}$$

Withdrawal: heat should be provided (endothermic)

M being the metal powder or matrix,
MHx being the metal hydride.

For example, a metal powder is used that is put into contact with hydrogen, an absorption phenomenon occurs and a metal hydride is formed. The hydrogen release is performed according to a desorption mechanism.

The hydrogen storage is an exothermic reaction, i.e. which releases heat, whereas the hydrogen release is an endothermic reaction, i.e. which absorbs heat.

It is attempted in particular to have a quick loading of the metal powder in hydrogen. To achieve such a quick loading, the heat produced during this loading should be removed to prevent the hydrogen absorption on the metal powder or matrix from being slowed down. During the hydrogen unloading, heat is provided consequently, the cooling and heating efficiency condition the loading and unloading flow rates.

Quasi systematically, the hydride and metal, which are both in a form of powder in tanks, have a density difference between 10% and 30%.

This variation in density within the tank has two results:
- on the one hand, the appearance of stresses inside the powder grains during absorption-desorption cycles, which causes them to be fractioned into smaller grains. This phenomenon is called decrepitation;
- on the other hand, the swelling of powder grains during the hydrogen absorption and the deswelling of grains during desorption. A free volume above the powder is then provided to take account of this swelling.

The decrepitation phenomenon and the swelling phenomenon are responsible for a gradual densification of the powder bed as the number of absorption-desorption cycles increases. Indeed, the decrepitation causes the appearance of finer and finer powders which migrate through gravity towards the tank bottom through the grain network. Moreover, when the hydrogen flow velocity is sufficiently high, grains are moved and rearranged in the tank. Besides, the powder bed tends to be retracted, that is its volume is decreased during a desorption which leaves an empty space between the tank walls and the hydrogen storage material bed. A powder migration occurs through gravity via this space and fills it. During the following absorption, the power of the formed hydride will not behave as a fluid. In particular, the powder bed level in the tank is not that achieved during the preceding absorption. Indeed, the frictions between grains and against the tank wall prevent the powder bed from freely expanding. The swelling of the powder grains is then compensated for by a reduction in the porosity size. The hydrogen/hydride storage material bed is thus gradually densified under the course of hydriding cycles.

By "hydriding cycle", it is meant an absorption phase followed by a hydrogen desorption phase.

Therefore, it is important to avoid accumulation of the hydrogen storage material, which could apply stresses that can damage the tank structure.

Document US 2004/0129048 describes a hydrogen tank wherein hydrogen is stored as metal hydride. This cylindrical shaped tank comprises powder filled longitudinal channels. Water circulation tubes are provided in some channels to remove heat.

On the one hand, this device does not provide a homogeneous powder distribution throughout the tank, which can cause the application of stresses damaging the structure. On the other hand, the heat exchanges are not optimum. Furthermore, the channel structure is complex to perform, and the powder filling is tedious.

Consequently, one object of the present invention is to provide a hydrogen storage tank capable of maintaining an homogeneous distribution of the powder of the tank. It is also an object of the present invention to provide a hydrogen tank having a simple construction.

DESCRIPTION OF THE INVENTION

The objects set out above are achieved by a hydrogen tank having a longitudinal axis comprising a outer containment enclosure and an inner structure for distributing the metal hydride, said structure comprising a plurality of superimposed stages, each stage comprising a plurality of channels extending in the direction of the longitudinal axis, said channels being divided into compartments by walls transverse to the longitudinal axis, each compartment being intended to contain a material capable of absorbing hydrogen. The tank also comprises heat exchangers. The channels of a stage are formed as a single space, each channel being formed by a bottom and two longitudinal side walls.

Thanks to the present invention, tight horizontal separations are simply formed. Besides, the manufacture is simplified because the number of pieces to be assembled is limited.

In other words, the powder is tightly contained per stage, the powder being besides distributed in cells limiting its displacement and accumulation, which could damage the tank.

The heat exchange system is for example in the form of channels, wherein the heat transfer fluid is intended to flow, the channels being interposed between each stage, ensuring a homogeneous heat capture or feed within the tank. This enables in particular the hydrogen "loading" time to be reduced.

Consequently, one subject-matter of the present invention is to provide a tank for storing hydrogen through absorption into a material, said tank having a longitudinal axis and comprising an outer enclosure and an inner structure having a longitudinal axis X, the inner structure comprising a plurality of stages extending along planes parallel to the longitudinal axis and a heat exchange system within the inner structure, each stage comprising a lower bottom, an upper bottom and longitudinal partition walls and transverse partition walls, said walls forming with the lower and upper bottoms compartments for receiving the hydrogen storage material, wherein the upper bottom and/or the upper bottom and the transverse partition walls or longitudinal partition walls are made as a single piece.

Particularly advantageously, the upper bottom and associated longitudinal partition walls are made as a single piece and the lower bottom and associated longitudinal partition walls are made as a single piece.

The upper bottom and associated longitudinal partition walls and the lower bottom and associated longitudinal partition walls are respectively made by folding a metal strip.

For example, the transverse partition walls are fixed on the longitudinal partition walls by cooperation of slots made in the longitudinal partition walls and the transverse partition walls.

The tank according to the present invention can comprise subassemblies formed by an upper bottom provided with transverse partition walls and longitudinal partition walls on one face and a lower bottom provided with transverse partition walls and longitudinal partition walls on one face, both bottoms being attached one to the other through their faces opposite to that carrying said partition walls.

The inner structure can then comprise a stack of said subassemblies, each compartment comprises a longitudinal partition wall of a subassembly and a longitudinal partition wall of another subassembly.

The tank according to the present invention comprises channels defined between the integral upper and lower bottoms, said channels defining the heat exchange system.

The subassemblies are for example such that a longitudinal partition wall carried by the upper bottom is contained in the same plane as a longitudinal partition wall carried by the lower bottom, and wherein the channels are defined directly below the longitudinal walls. Upon folding to form the longitudinal partition walls, the base of the partition walls can be advantageously shaped to provide a semi-circular cross-section groove. Pipes can be accommodated in the channels formed by two said grooves facing each other.

Advantageously, the pipes are brazed to the walls of the channels.

The tank can comprise means for feeding hydrogen within the compartments, for example formed by porous pipes.

Notches are for example made in the transverse partition walls.

For example, the height of a compartment accounts for 50 to 110% of the length and 50 to 110% of the width.

Another subject-matter of the present invention is also a hydrogen storage tank comprising a tank according to the present invention and a hydrogen storage material provided in the compartments.

The material is advantageously put in the compartments as an ingot.

A free volume accounting for 12% to 60% of the volume of the compartment is advantageously provided in each compartment.

The hydrogen storage material can consist of at least one material of the $A_mB_n$ type consisting of an element A forming a stable hydride such as alkaline or alkaline earth metals like lithium, calcium or magnesium, fourth or fifth column transition metals like zirconium, titanium or metal rare earth like lanthanum, cerium and of an element B forming an unstable hydride under the standard conditions, such as most transition metals like chromium, cobalt, nickel or iron.

Another subject-matter of the present invention is also to provide a method for making a tank for hydrogen storage according to the present invention, comprising the steps of:

a) cutting a metal strip to the desired dimensions, a) folding said strips so as to form longitudinal channels bounded by longitudinal partition walls, c) mounting the transverse partition walls to bound compartments with the longitudinal partition walls, d) stacking thus formed elements and filling with the hydrogen storage material, e) placing into an enclosure, f) introducing hydrogen in the enclosure whereby the material(s) in each of the compartments is (are) transformed into metal hydride.

The making method can comprise, prior to step d), a step c') during which two elements are attached one to the other through their face opposite to that carrying the partition walls, thus making subassemblies, and during step d), said subassemblies are stacked.

In step c'), pipes of the heat exchange system are provided between both elements, wherein said pipes can be brazed to each element.

The hydrogen storage material is advantageously in the form of an ingot when placed into the compartments.

BRIEF DESCRIPTION OF THE DRAWINGS

The present invention will be better understood using the following description and the appended drawings wherein.

DETAILED DESCRIPTION OF PARTICULAR EMBODIMENTS

Figure 1:
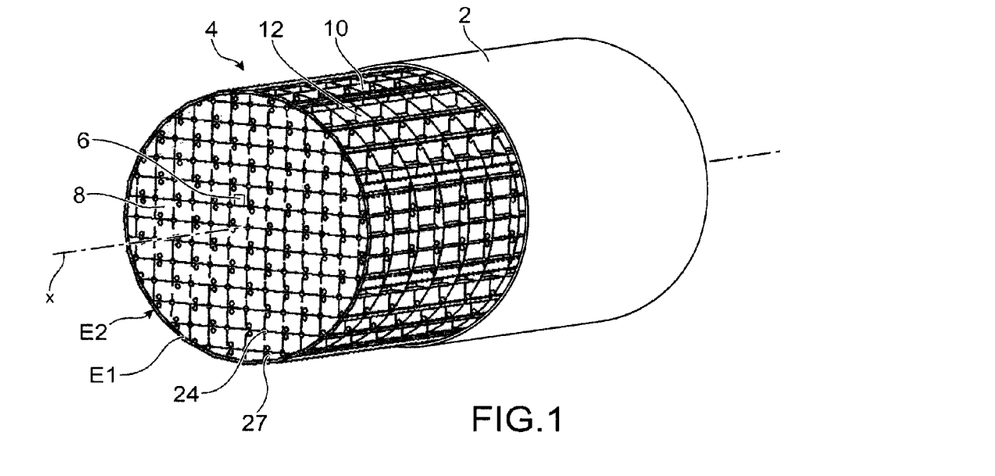
FIG. 1 is a partially broken away perspective view of an exemplary embodiment of the tank according to the present invention and wherein the inner structure of a tank according to the present invention is visible.

In FIG. 1, an exemplary embodiment of a hydrogen tank according to the present invention can be seen.

Figure 5:
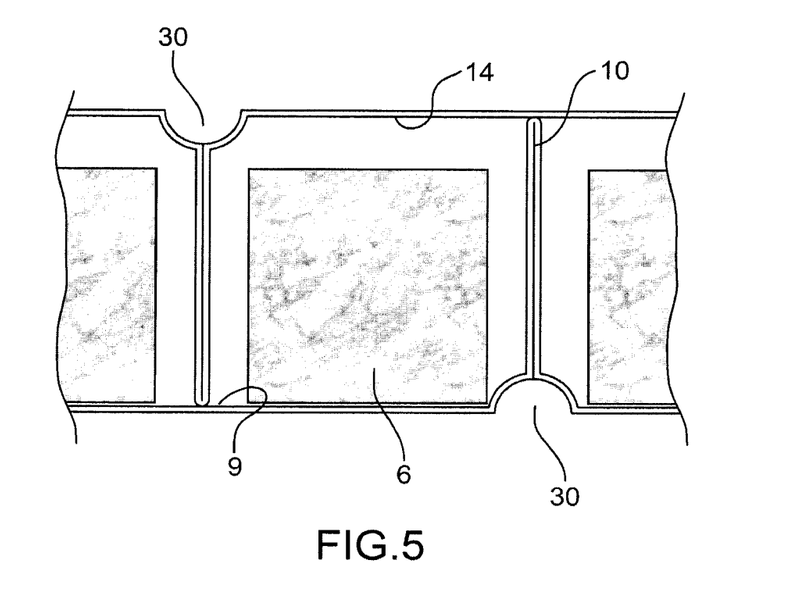
FIG. 5 is a front view of a detail of the inner structure of the tank with the metal material as an ingot.

The tank comprises an outer enclosure 2 that can withstand the hydrogen pressure, and an inner structure 4 for receiving a hydrogen storage material 6 represented in FIG. 5.

The outer enclosure 2 has, in the example represented, a circular section cylinder shape having a longitudinal axis X. This shape is advantageous for the pressure resistance, just like a toric shape, but is in no way limiting, the outer enclosure 2 could for example have a toric or square cross-section.

The tank is intended to be substantially horizontally provided in operation. Accordingly, the axis X is intended to be in a horizontal position or substantially in a horizontal position.

Generally, the tank is connected to a hydrogen flow circuit connected to one or both longitudinal ends of the enclosure to load the tank with hydrogen and unload the hydrogen off the tank. Moreover, a heat exchange system which will be described later ensures the flow of a heat transfer fluid from one longitudinal end to the other. The tank is thus generally subjected to longitudinally directed hydrogen and heat transfer fluid flows.

The tank, and more particularly the inner structure, thus advantageously have an architecture suitable for the longitudinal flows. But the present invention can be suitable for flows having another orientation.

In the present application, the elements or parts of elements are said to be "upper" and "lower" when they are intended to have a high or low position in the representation of the tank of FIG. 1, but this is in no way limiting.

The outer enclosure 2 is for example of stainless steel, aluminium or woven composite material. In the case of so-called low pressure hydride tanks, the pressures which the enclosure resists are in the order of 1 to 50 bars hydrogen. In higher pressure applications, the pressures which the enclosure resists are between 50 bars and 350 bars, or even 700 bars.

The inner structure 4 comprises a plurality of superimposed stages E1, E2, . . . En, n being an integer. The stages extend in planes parallel to the longitudinal axis. In the examples represented, they are horizontal.

Each stage E1, E2, . . . En is divided into compartments 8. More particularly, each stage comprise a lower bottom 9, longitudinal partition walls 10, transverse partition walls 12 and an upper bottom 14 bounding the compartments 8.

Advantageously, the compartments have a low slenderness ratio, i.e. a height reduced with respect to its area to avoid a stress concentration in the lower part of the partition walls upon swelling of the hydrogen storage material.

For example, in order to achieve hydrogen absorption characteristics in the tank in the order of a few tens of minutes, the dimensions of the cell are about 25 mm to 50 mm for the width, the depth and the height of the compartments. The free space above the powder has a height between 5 mm and 10 mm, depending on the swelling of the hydride used.

The inner structure 4 also comprises a heat exchange system 16 capable of ensuring a heat removal of the compartments and a heat feed in the compartments homogeneously, that is located as close as possible to the hydride material. The heat exchange system 16 is provided between each stage and uses, among other things, the longitudinal partition walls as heat exchange surfaces.

To do this, heat exchange system 16 comprises channels 18 extending longitudinally through the structure and running along the lower bottoms and upper bottoms 14.

Figure 2:
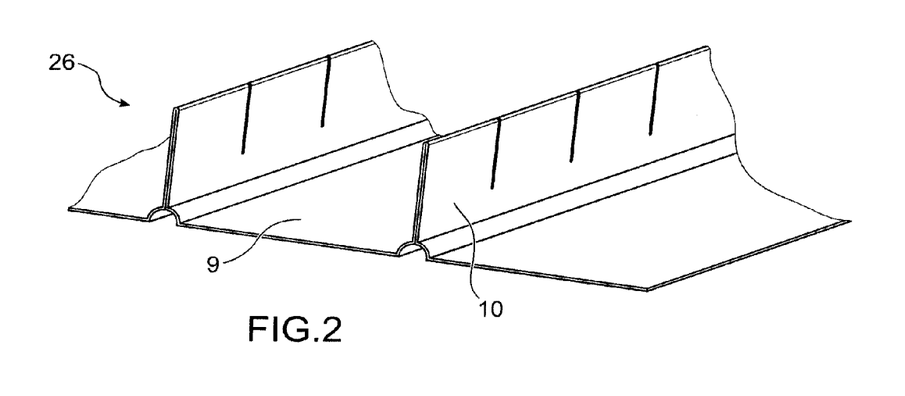
FIG. 2 is a perspective view of an isolated element of the structure of FIG. 1, FIGS. 3A and 3B are perspective views of an isolated part of the inner structure according to the present invention that is being made.

Particularly advantageously, elements 26 comprising the lower bottom 9 or the upper bottom 14 and the longitudinal partition walls 10 are made as a single piece, for example through folding a metal strip as can be seen in FIG. 2. Making this element 26 as a single piece, besides the fact that the manufacture is simplified since the number of pieces is reduced and an assembly through welding is avoided, simply ensure both a tightness between each stage preventing the hydrogen storage material from passing from one stage to the other, in particular from falling into the lower stages, and a transverse tightness by means of longitudinal partition walls.

The longitudinal partition walls 10 are for example made by folding two portions of strips against each other, without leaving space between the two portions of strips on most of their surface.

Also very advantageously, substantially similar elements 26 can be provided to define the lower bottom and longitudinal partition walls and to define the upper bottom and longitudinal partition walls. The assembly of these two substructures bounds the compartments.

For mounting the transverse partition walls 12, vertical cut-outs 20 are made in the longitudinal partition walls 12 at their free end along the axis X, their spacing defining the length of the compartments. Similar cut-outs are also made in the transverse partition walls 12. Upon mounting the transverse partition walls 12, the cut-outs are put in correspondence and the partition walls 10, 12 penetrate each other, so as to form "racks". The cut-outs in the longitudinal and transverse partition walls have a length lower than the height of the partition walls.

The longitudinal 10 and transverse 12 partition walls restrict the transverse and longitudinal displacements, respectively, of the hydrogen storage material.

For example, if the tank is on-board an automotive vehicle, the latter has not always necessarily a substantially horizontal position and can undergo vibrations, tending to move the powder. Moreover, these partition walls ensure a rigidification of stages.

Also particularly advantageously, the heat exchange system is integrated in the inner structure 4 upon making the longitudinal partition walls 10. To do this, the base of the longitudinal partition walls 10 is formed by a groove 30 having a semi-circular section longitudinal axis. By assembling a upper bottom and a lower bottom, both grooves are facing each other and bound a cylinder forming a channel 18.

Figure 3A:
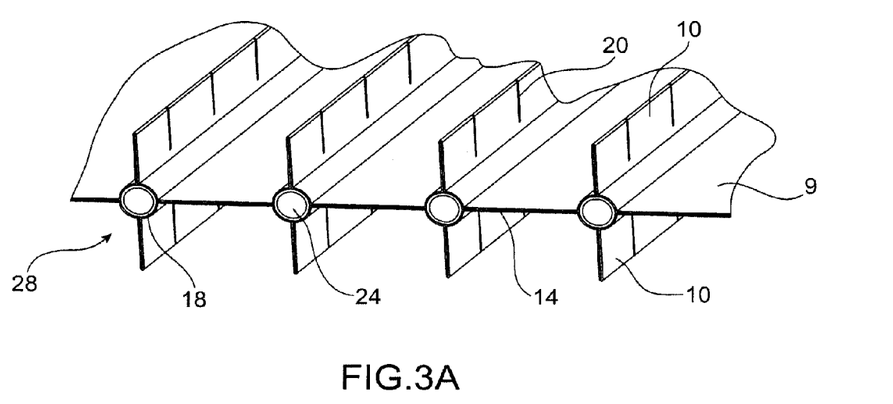
Figure 3B:
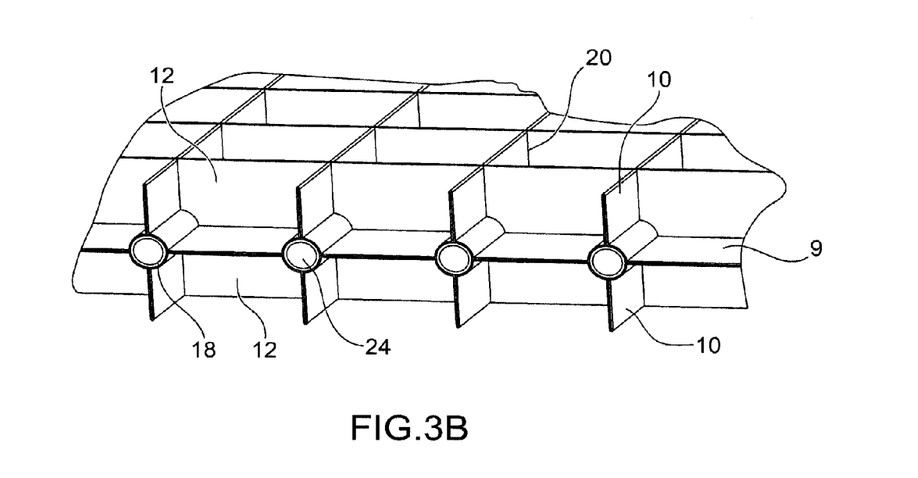
Figure 4:
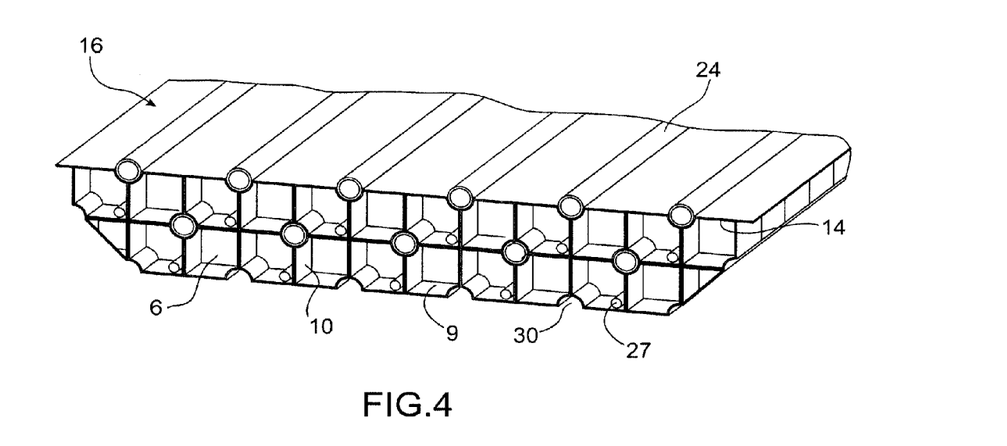
FIG. 4 is a perspective view of two stages of the inner structure according to the present invention.

The channel 18 can directly form a heat transfer fluid flow channel or otherwise, as represented in FIGS. 1, 3 and 4, a pipe 24 can be introduced into the channel 18. Advantageously, the pipe 24 is brazed on the strip to improve heat exchanges.

The channel 18 or pipe 24 is connected through an end (not represented) to a heat transfer fluid feed and the other end (not represented) is connected to heat transfer fluid discharge. The pipe 24 is for example of aluminium or stainless steel.

The hydrogen storage material is provided in each compartment.

A free volume 25 is provided above the powder to avoid mechanical interactions between the material and the upper bottom when the material swells as a result of the hydrogen loading.

This free volume 25 is made by providing a gap between the material and the structure upon assembling. When the material being placed is in the form of an ingot, a side gap and a gap with the upper bottom are provided. After different decrepitations, the material forms a powder bed in contact with the side walls and separated from the upper bottom by the free volume 25.

For performing the material loading with hydrogen, hydrogen can simply be flowed in the compartments at the upper parts of the compartments, the hydrogen flowing in the free volumes 25. To that end, the transverse walls 12 can be cut out, preferably in the upper part in correspondence with the free volume 25.

Porous hydrogen feeding tubes 27 can be further added passing through the hydrogen storage material in the case where the permeation between the hydrogen storage material and hydrogen lying in the free volume 25 is not sufficient, because of the material densification during the successive decrepitations. In the case where porous pipes are provided, the transverse partition walls 12 are cut out for pipes 27 to pass therethrough. For example, a pipe is provided per row of compartments extending along the longitudinal direction. These tubes also enable the desorbed hydrogen to be collected.

Advantageously, the tubes 27 are located at the bottom of the compartments and substantially along their longitudinal axis. Alternatively, they can pass through the free volume 25.

The transverse partition walls 12 advantageously comprise recesses or notches (not represented) at the upper end to enable hydrogen to flow from one compartment to the next one along the axis X.

Such recesses can be provided in the longitudinal partition walls.

The collection of hydrogen, upon desorption, is also performed by the free volumes 25 of the compartments.

The material forming the structure 4 is preferentially a very good heat conducting material to ensure an efficient removal or feed. Advantageously, the structure is made of aluminium. Copper can also be used. These materials further have the advantage of allowing a ready shaping, in particular by folding and cutting-off. Stainless steel can also be used.

One exemplary method for making a tank of FIG. 1 will now be described.

In a first step, metal strip or sheets are made to the desired dimensions. Typically, the strip is a few hundred microns thick.

In a following step, the strip is folded to obtain great folded lengths depending on the folding pattern to obtain the element 26 of FIG. 2. Since the tank of FIG. 1 has a circular cross-section, the different stages have not the same area. Then, a folded strip having a great dimension is advantageously used, wherein each folded structure 26 is cut away taking account of the stage where it is located.

Then, two elements 26 are assembled back to back, such that the lower bottom of an element and the upper bottom of another element are contacting each other and the longitudinal partition walls projecting from the lower bottom and projecting from the upper bottom are substantially coplanar two by two. This assembly, represented in FIG. 3A, also bounds the channels 18 between the lower bottom and the upper bottom. This assembly is designated subassembly 28. The back to back assembly of both elements 26 can be performed by brazing in an oven, which improves the heat conduction properties of the assembly, in this case, the rolls of metal strips which are already coated with brazing can advantageously be used. The assembly can also be formed by simply making a few weld points through resistive welding. If pipes 24 are provided for flowing the heat transfer fluid, they can be placed prior to assembling both elements 26. Advantageously, the pipes are brazed to the elements in the grooves, which results in improving the heat exchanges between the pipes and the elements.

In a following step, the transverse partition walls 12 are placed in vertical cut-outs 20, as represented in FIG. 3B. Then, spaces are bounded on the lower bottom and the upper bottom, thus bounded spaces corresponding to the surface of both compartments.

In a following step, the hydrogen storage material is provided in the lower bottom of the compartments. This material can be in the form of a powder.

Particularly advantageously, the hydrogen storage material is in the form of a solid ingot. Two ingots are provided in each space distant from one another. The implementation of ingots enables an easier placement of the following subassembly.

The shape of the ingots is substantially analogous to that of the compartments.

The porous hydrogen feed tubes are also placed during this step.

In a following step, an upper subassembly is provided on the lower subassembly comprising the hydrogen storage material, by providing the longitudinal partition walls between two longitudinal partition walls of the lower subassembly between two ingots, as represented in FIG. 4. A stage is thus formed. The free end of the longitudinal partition walls of the upper subassembly is contacting the lower bottom of the first subassembly and the free end of the longitudinal partition walls of the lower subassembly is contacting the bottom of the second upper subassembly. These contacts are not tight, but narrow enough to restrict the passage of great amounts of material from one compartment to the other. Also for the transverse partition walls, they are not tight, however they form a sufficient barrier. Besides, it is reminded that the axis of the tank is intended to remain substantially horizontal. Consequently, the side movements of the material are low. On the other hand, thanks to the invention, the separation between stages being as a single piece, the material is prevented from passing to an lower stage.

The previous steps are repeated until the inner structure with the desired size is obtained.

The subelements are immobilized with respect to each other along the longitudinal and transverse directions because of their nesting through transverse partition walls 12 and vertical cut-outs 20 wherein the transverse partition walls 12 are inserted.

Of course, the first and last stages are not exactly made as the intermediate stages. Indeed, in the example represented, the first stage only comprises an upper bottom and longitudinal and transverse partition walls and the last subassembly only comprises a lower bottom, longitudinal and transverse partition walls.

The final structure is then introduced in the outer enclosure 2. The connections of the porous pipes and the pipes of the heat exchange system are performed and the enclosure is tightly closed.

During the first hydrogen loadings, a decrepitation phenomenon occurs, i.e. hydrogen is absorbed by the metal ingots, which swell and burst into fine particulars forming a powder.

Figure 6:
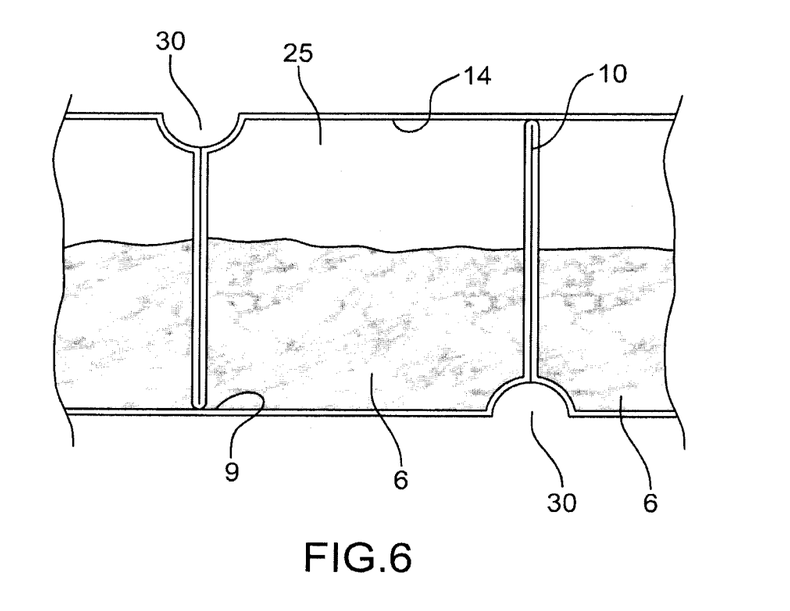
FIG. 6 is a schematic representation of a powder filled compartment after the ingot initially contained has decrepited.

After several loading steps, the compartment contains powder in contact with the lower bottom and the side and transverse partition walls as schematically represented in FIG. 6.

Of course, the inner structure of the tank can be constructed by superimposing the elements 26, these comprising the required longitudinal partition walls and bounding the bottom and the side walls of the compartments.

It could be contemplated to make the transverse partition walls 12 through folding, wherein the longitudinal partition walls 10 can be mounted by nesting as it is described for the transverse partition walls 12.

By way of example, the material provided in the compartments can be comprised of one or more materials used for storing hydrogen. These hydrogen storage materials can be selected from different families such as AB, $A_2B$, $A_2B_7$, $AB_2$ or $AB_5$ or be a mixture of these families of materials.

The reversible metal hydrides of the formula $A_mB_n$ consist of an element A forming a stable hydride such as alkaline or alkaline earth materials like lithium, calcium or magnesium, fourth or fifth column transition metals like zirconium, titanium, or finally metal rare earth such as lanthanum, cerium and of an element B forming an unstable hydride in the standard temperature and pressure conditions, such as most transition metals like chromium, cobalt, nickel or iron.

These materials can have a body-centred cubic (bcc) structure, a face-centred cubic (fcc) or a C-14 or C-15 type crystallographic structure.

For example, these materials can be Mg, Mg—Ni, Mg—Cu, Ti—Fe, Ti—Mn, Ti—Ni, Ti—V, Mn—Ni, Ti—V—Cr, Ti—V—Fe. The hydrogen absorption capacities depending on the pressure and temperature used vary according to the hydrogen storage materials.

Other hydrogen absorbing materials such as complex chemical hydrides with light elements such as alanates (NaAlH4), Li and B base hydrides such as LiBH4, NaBH4, or otherwise imides or amides, can also be used in the described geometry in the present invention.

The operation of this tank will now be explained.

When the tank needs to be loaded with hydrogen, hydrogen is flowed in the tank, for example through the porous pipes. Since the absorption reaction is exothermic, heat is released. The heat is simultaneously discharged by flowing a cool heat transfer fluid in the pipes 24 which is located at the intersection of two longitudinal partition walls and between the pairs of lower bottom and upper bottom. The partition walls, in particular the longitudinal partition walls 10, the lower bottom and the upper bottom operate as cooling fins, capturing heat and conducting it to the heat transfer fluid flowing in the pipes 24. The more quickly and efficiently the heat is discharged, the quicker the loading of the tank. The hydrogen loaded material then forms a metal hydride. As already explained, the material swells due to absorption and decrepitates, to form powder.

When hydrogen contained in the tank needs to be used, the hydrogen pressure is lowered in the tank and/or the hydride is heated via the pipes of the heat exchanger and the fins formed by the inner structure. The hydrogen is desorbed. The thus released hydrogen flows from one free volume 25 to the other via the notches made in the upper part of the partition walls 10, 12 and is collected at a longitudinal end of the tank.

The loading and unloading temperature of the tank ranges for example from −20° C. to 400° C. The loading pressure ranges for example from 0.1 bars to 200 bars $H_2$, and the unloading pressure ranges for example from 100 bars to 0 bar (absolute).

The tank according to the present invention offers a very good trade-off between the added mass because of the inner structure 4 separating the hydrogen storage material and the resulting heat exchange efficiency.

Furthermore, it offers cells whose dimension along the vertical direction can be easily lower than or at most in the same order of magnitude as the dimensions of the cell in the horizontal directions by taking the representation of FIG. 4 into account, which enables the mechanical stresses to be restricted on the lower parts of the compartments. A sufficient space can be provided in each cell for the material to be able to expand without impediment. This space is located about and above the ingots upon assembly and is located above the hydride powder bed formed after decrepitation.

Besides, it avoids the migration of the powder between the different cells along the vertical direction.

On the other hand, the heat exchange system is distributed in layers in the inner structure ensuring an efficient heat exchange between the structure and the storage material.

The tank according to the present invention can be applied to all the applications implementing hydrogen storage, both in fields implementing a storage of high amounts and those requiring a storage of small amounts.

For example, it can be used as a tank for locomotive means, such as watercrafts, submarines, such as private cars, buses, lorries, building and agricultural machines and two-wheeled vehicles.

It can also be used in power supplies for portable devices such as portable electronic apparatuses (portable phone, portable computers . . . ).

It can also be applied to storage systems for higher amounts, such as for generator sets, for storing hydrogen generated in high amounts thanks to the energy from wind turbines, photovoltaic panels or geothermics.

The invention claimed is:

1. A tank configured to store hydrogen through absorption into a hydrogen storage material, the tank having a longitudinal axis, and comprising:
   an outer enclosure;
   an inner structure having the longitudinal axis, the inner structure being disposed in the outer enclosure and comprising a plurality of stages extending along planes parallel to the longitudinal axis, the plurality of stages being superimposed along said planes in a direction perpendicular to the longitudinal axis,
   each stage of the plurality of stages comprising a lower bottom, an upper bottom, longitudinal partition walls, and transverse partition walls,
   the longitudinal partition walls, the transverse partition walls, the lower bottom, and the upper bottom together forming a plurality of compartments within said each stage, each of the plurality of compartments being configured to receive the hydrogen storage material, and
   at least one of the upper bottom and the lower bottom and the transverse partition walls or the longitudinal partition walls, being a single piece and extending along an entire length of said each stage; and
   a heat exchange system disposed within the inner structure.

2. The tank according to claim 1, wherein a first single piece includes the upper bottom and a first plurality of the longitudinal partition walls, and a second single piece includes the lower bottom and a second plurality of the longitudinal partition walls.

3. The tank according to claim 2, wherein the first single piece including the upper bottom and the first plurality of the longitudinal partition walls is a first metal strip, and the second single piece including the lower bottom and the second plurality of the longitudinal partition walls is a second metal strip.

4. The tank according to claim 1, wherein the longitudinal partition walls include a first plurality of slots therein and the transverse partition walls include a second plurality of slots therein, the longitudinal partition walls being joined with the transverse partition walls at the first plurality of slots and the second plurality of slots, respectively.

5. The tank according to claim 1, further comprising subassemblies including at least a first subassembly and a second subassembly,
wherein the first subassembly includes the upper bottom, a first plurality of the transverse partition walls, and a first plurality of the longitudinal partition walls, the first plurality of the transverse partition walls and the first plurality of the longitudinal partition walls being attached to a first face of the upper bottom,
wherein the second subassembly includes the lower bottom, a second plurality of the transverse partition walls, and a second plurality of the longitudinal partition walls, the second plurality of the transverse partition walls and the second plurality of the longitudinal partition walls being attached to a first face of the lower bottom, and
wherein the first subassembly and the second subassembly are attached along a second face of the upper bottom and a second face of the lower bottom, the second face of the upper bottom being opposite to the first face of the upper bottom, and the second face of the lower bottom being opposite to the first face of the lower bottom.

6. The tank according to claim 5, wherein the inner structure comprises a stack of the subassemblies, each compartment of the plurality of compartments comprises a first longitudinal partition wall of one subassembly of the subassemblies and a second longitudinal partition wall of another subassembly of the subassemblies.

7. The tank according to claim 5, wherein the heat exchange system comprises channels extending in the longitudinal direction along the second face of the upper bottom and along the second face of the lower bottom in the subassemblies.

8. The tank according to claim 7, wherein each longitudinal partition wall of the first plurality of the longitudinal partition walls attached to the first face of the upper bottom is coplanar with a corresponding longitudinal partition wall of the second plurality of the longitudinal partition walls attached to the first face of the lower bottom, and
wherein the channels are disposed between a base of said each longitudinal partition wall of the first plurality of the longitudinal partition walls and a corresponding base of said corresponding longitudinal partition wall of the second plurality of the longitudinal partition walls.

9. The tank according to claim 8, wherein the base of said each longitudinal partition wall of the first plurality of the longitudinal partition walls has a shape of a semi-circular cross-section groove, and wherein the corresponding base of said corresponding longitudinal partition wall of the second plurality of the longitudinal partition walls also has the shape of the semi-circular cross-section groove.

10. The tank according to claim 9, further comprising pipes arranged in the channels between the semi-circular cross-section groove of the base of said each longitudinal partition wall of the first plurality of the longitudinal partition walls and the semi-circular cross-section groove of the corresponding base of said corresponding longitudinal partition wall of the second plurality of the longitudinal partition walls.

11. The tank according to claim 10, wherein the pipes are joined to an inner surface of the channels along a brazed interface therebetween.

12. The tank according to claim 1, further comprising means for feeding hydrogen within the plurality of compartments, or porous pipes configured to feed hydrogen within the plurality of compartments.

13. The tank according to claim 1, wherein the transverse partition walls include notches therein.

14. The tank according to claim 6, wherein a height of said each compartment is 50% to 110% of its length and 50% to 110% of its width.

15. A hydrogen storage tank comprising the tank according to claim 1 and the hydrogen storage material provided in the plurality of compartments.

16. The hydrogen storage tank according to claim 15, wherein the hydrogen storage material provided in the plurality of compartments is an ingot.

17. The hydrogen storage tank according to claim 15, wherein a free volume comprising 12% to 60% of the volume of each of the plurality of compartments is provided in each of the plurality of compartments.

18. The hydrogen storage tank according to claim 15, wherein the hydrogen storage material consists of at least one $A_m B_n$ type material, consisting of an element A forming a stable hydride or alkaline or alkaline earth metals like lithium, calcium or magnesium, fourth or fifth column transition metals or zirconium, titanium or rare earth metal or lanthanum, or cerium, and of an element B forming an unstable hydride under standard conditions, or transition metals or chromium, cobalt, nickel or iron, and wherein m and n are integers.

* * * * *